United States Patent
Fukahori

(10) Patent No.: US 6,469,698 B2
(45) Date of Patent: *Oct. 22, 2002

(54) IMAGE DISPLAY APPARATUS

(75) Inventor: Hidehiko Fukahori, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/218,113

(22) Filed: Dec. 21, 1998

(65) Prior Publication Data

US 2002/0036647 A1 Mar. 28, 2002

(30) Foreign Application Priority Data

Dec. 24, 1997 (JP) ................................ 9-365955
Apr. 15, 1998 (JP) ............................... 10-119926

(51) Int. Cl.⁷ .................................................. G09G 5/00
(52) U.S. Cl. ....................................................... 345/204
(58) Field of Search ................................ 345/203, 326, 345/348, 355, 156, 169, 204, 205, 207; 707/3, 4, 103, 200, 522, 100; 395/61

(56) References Cited

U.S. PATENT DOCUMENTS

| | | | | |
|---|---|---|---|---|
| 4,999,790 A | * | 3/1991 | Murayama et al. | 364/521 |
| 5,220,625 A | * | 6/1993 | Hatakeyama et al. | 382/54 |
| 5,335,072 A | * | 8/1994 | Tanaka et al. | 348/232 |
| 5,369,742 A | * | 11/1994 | Kurosu et al. | 395/147 |
| 5,519,865 A | * | 5/1996 | Kondo et al. | 395/600 |
| 5,537,132 A | * | 7/1996 | Teraoka et al. | 345/133 |
| 5,546,529 A | * | 8/1996 | Bowers et al. | 395/159 |
| 5,666,578 A | * | 8/1999 | Oikawa et al. | 396/319 |
| 5,945,982 A | * | 8/1999 | Higashio et al. | 345/203 |

* cited by examiner

Primary Examiner—Vijay Shankar
(74) Attorney, Agent, or Firm—Robin, Blecker & Daley

(57) ABSTRACT

An image display apparatus includes an image reading part for reading an image from an image recording medium, a position reading part for reading absolute-position information indicative of a position, from the image recording medium, a storage medium which stores a plurality of place-name data corresponding to the absolute-position information, and a display part for selecting and displaying particular place-name data corresponding to the absolute-position information.

8 Claims, 9 Drawing Sheets

IMAGE DISPLAY APPARATUS

BACKGROUND OF THE INVENTION

1. Field of the Invention

The present invention relates to an image display apparatus capable of reading image information and place-name information from an image recording medium and displaying the read image information and place-name information.

2. Description of Related Art

A film including a photographing film portion having a magnetic recording portion has recently been proposed, and various information can be recorded on the film together with a photographed image.

A camera capable of digitally recording not only image information but also various information has also been proposed, and one representative example of such camera is a digital camera.

There have been users who desire that such a camera should have the function of recording a place name for each photograph so that they can confirm where each photograph is taken. This is because a user who visits and photographs, for example, many temples occasionally confuses place names among similar photographed temples at a later time.

To meet the above-described demand, the following types of cameras and the like have heretofore been proposed.

Japanese Laid-Open Patent Application No. Hei 6-110117 proposes a camera which has a place-name data table and data selecting means and is arranged to select and specify place-name information and magnetically record a place name on a magnetically recordable type of film.

Japanese Laid-Open Patent Application No. Hei 7-077737 proposes a camera which receives absolute-position information such as latitude and longitude through radio waves transmitted from satellites, converts the absolute-position information into a place name in accordance with tabulated place-name data, and records the place name on a film.

Furthermore, Japanese Laid-Open Patent Application No. Hei 8-240854 proposes a filing apparatus which has a geographic database and is capable of converting position information recorded on a film into a place name.

However, according to Japanese Laid-Open Patent Application No. Hei 6-110117, a photographer must carry the burden of manually specifying a place name during photography. In addition, since the camera has the place-name data table, the camera needs a huge storage capacity.

According to Japanese Laid-Open Patent Application No. Hei 7-077737, a photographer must similarly carry the burden of manually specifying a place name on the basis of absolute-position information during photography. In addition, since the camera has the place-name data table, the camera needs a huge storage capacity.

In contrast, in Japanese Laid-Open Patent Application No. Hei 8-240854, since the filing apparatus has a geographic database, a camera does not need a large storage capacity. However, a user needs to perform conversion to a place name each time he/she takes a photograph, and must perform an awkward operation for this purpose. In addition, since a converted place name and image information are respectively recorded on separate media, the image information recorded on one medium may not accurately reflect the converted place name recorded on another medium. Moreover, although individual users have different tastes as to the manner in which position information is converted into a place name, Japanese Laid-Open Patent Application No. Hei 8-240854 has no description to cope with such a demand. For example, if individual users are to convert "LONGITUDE 139°41'06''" and "LATITUDE 35°33'48''" into a place name, whether to convert the position information into "○○ Inc.", "Ohta-ku", "Tokyo" or "Japan" depends on the tastes of the respective users, but there is no proposal to meet this demand.

BRIEF SUMMARY OF THE INVENTION

It is, therefore, an object of the present invention to provide an image display apparatus capable of automatically converting absolute-position information into place-name information and displaying the same.

Other objects of the present invention will become apparent from the following detailed description of preferred embodiments of the present invention, taken in conjunction with the accompanying drawings.

DETAILED DESCRIPTION OF THE INVENTION

Preferred embodiments of the present invention will be described below in detail with reference to the accompanying drawings.

Figure 1:
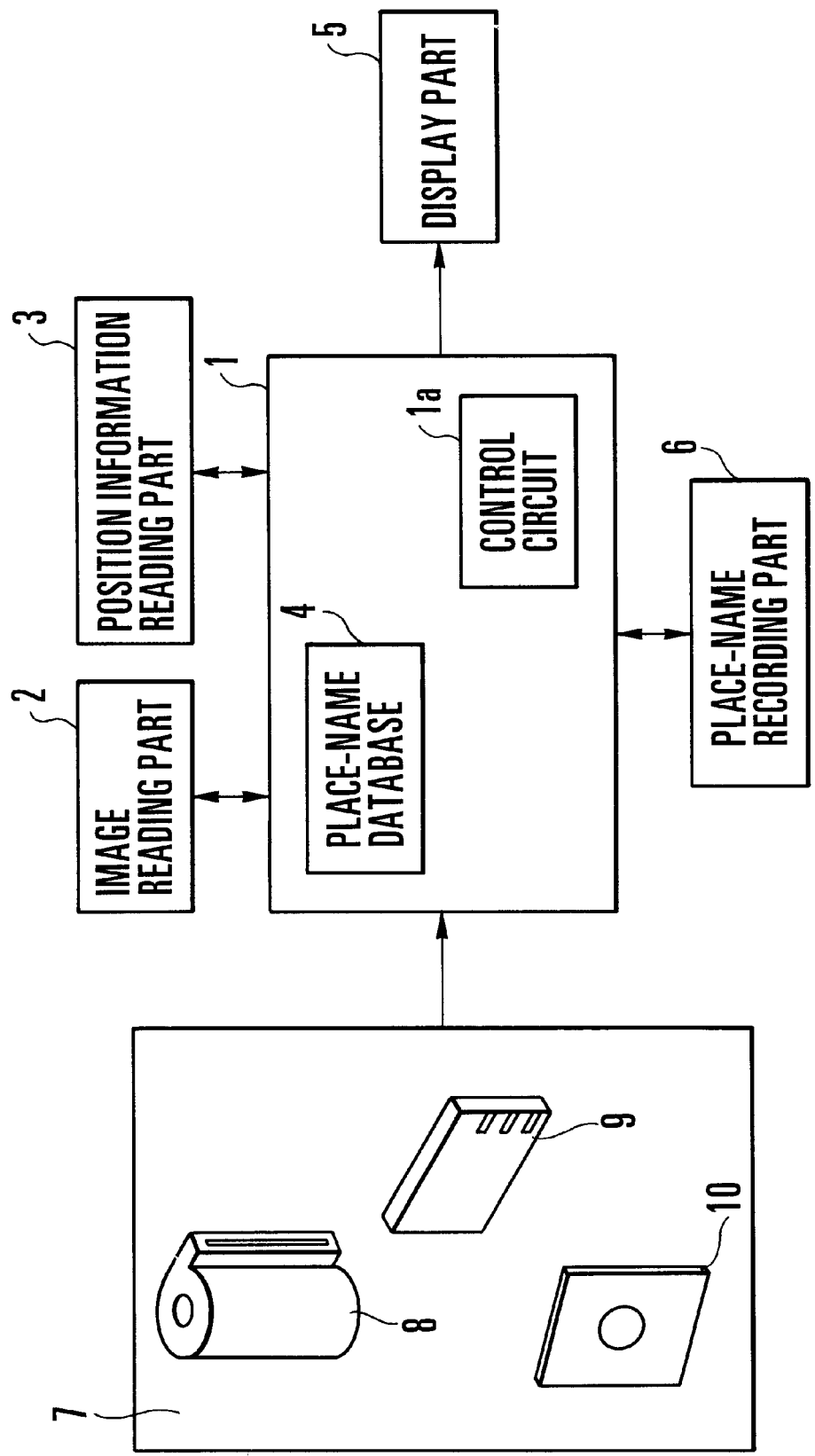
FIG. 1 is a block diagram schematically showing the arrangement of an image display apparatus according to one embodiment of the present invention.

FIG. 1 is a block diagram showing the arrangement of an image display apparatus according to one embodiment of the present invention.

Referring to FIG. 1, an image-display-apparatus body part 1 has a control circuit 1a and a place-name database 4, and connected to the image-display-apparatus body part 1 are an image reading part 2, a position information reading part 3, a display part 5 for displaying an image or information, and a place-name recording part 6 for recording a converted place name on an original medium. All of these elements constitute the image display apparatus.

An image recording medium 7 is, for example, a magnetically recordable type of film 8, a solid-state memory 9 in which an image and absolute-position information are digitally recorded, or a similar floppy disk 10.

The image recording medium 7 is arranged to be connectable to the image-display-apparatus body part 1.

An image photographed during photography using a camera and its absolute-position information can be recorded in the image recording medium 7. The absolute-position information is provided by a GPS (Global Positioning System) receiver (position measuring means for receiving radio waves from satellites and outputting position information) which is incorporated in the camera. When photography is performed with the camera with the absolute-position information being recordable, the absolute-position information is automatically recorded during the photography as information which is converted into a particular code.

Specifically, if the image recording medium 7 is the magnetically recordable type of film 8, an image is optically recorded and its absolute-position information is digitally magnetically recorded on a magnetic layer with which the film 8 is coated. If the image recording medium 7 is the solid-state memory 9 or the floppy disk 10, an image is converted into a digital signal by a solid-state image pickup element, while its absolute-position information is digitally recorded as coded information together with the image information.

Figure 2:
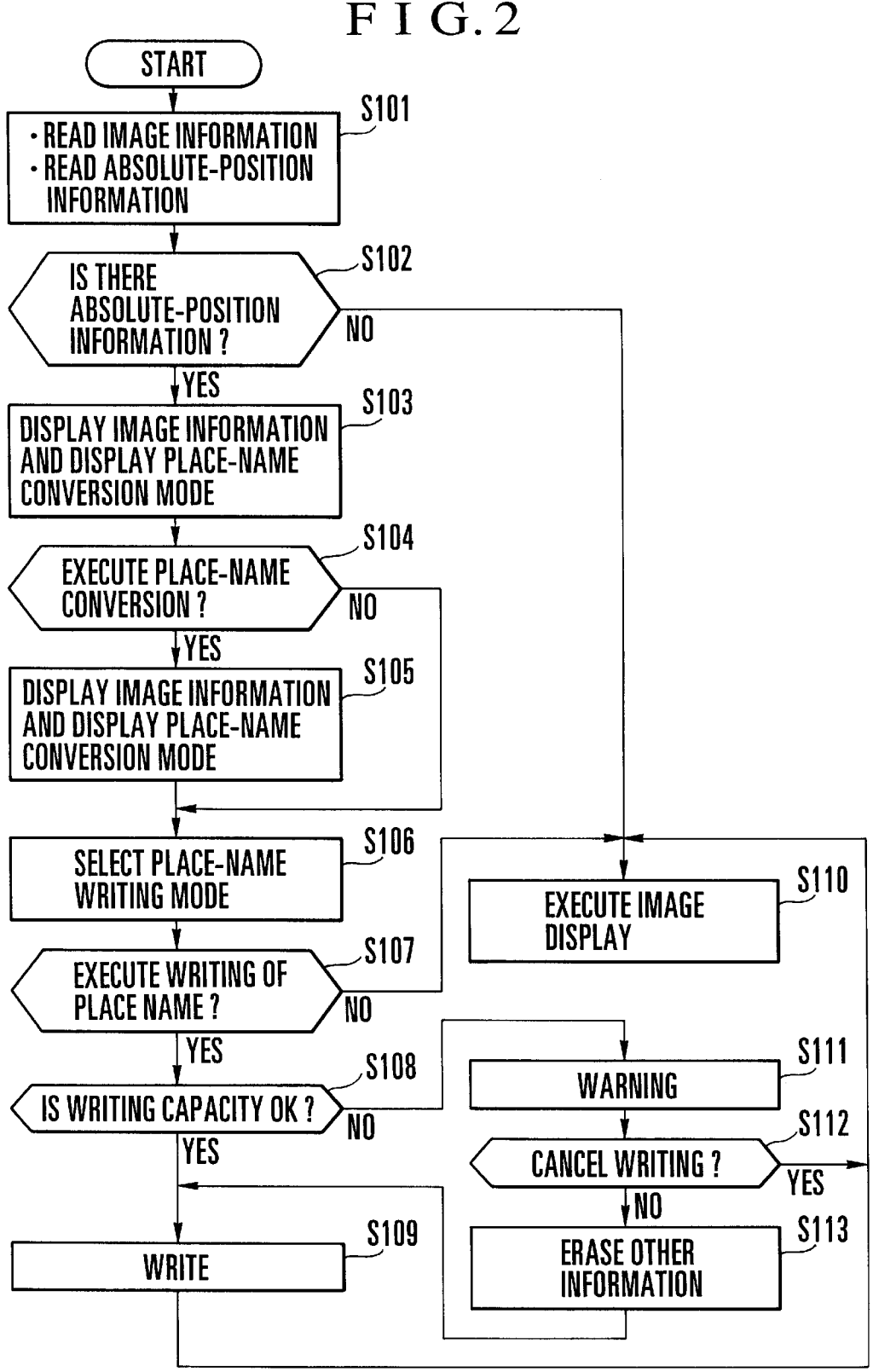
FIG. 2 is a flowchart showing the operation of the image display apparatus shown in FIG. 1.

The operation of the image display apparatus having the above-described arrangement will be described below with reference to the flowchart shown in FIG. 2.

If the image recording medium 7 is connected to the image-display-apparatus body part 1 and a start switch (not shown) is turned on, the control circuit 1a starts its operation in Step S101, and then in Step S102, operates the image reading part 2 to read image information from the image recording medium 7. At the same time, the control circuit 1a operates the position information reading part 3 to read the corresponding absolute-position information from the image recording medium 7.

If the image recording medium 7 is the magnetically recordable type of film 8, the image information is read by, for example, an image scanner, while the absolute-position information is read by, for example, a magnetic head. If the image recording medium 7 is the solid-state memory 9 or the floppy disk 10, the image information and the absolute-position information are respectively read as digital signals by a known art.

In the next step S102, the control circuit la determines whether there is absolute-position information in the read information. If there is no absolute-position information, the process immediately proceeds to Step S110, in which the display part 5 is made to display only the read image information. The display part 5 may be a known color liquid crystal display part integral with the image display apparatus, or a television set or a CRT monitor which is externally connected to and controlled by the image display apparatus.

Figure 3:
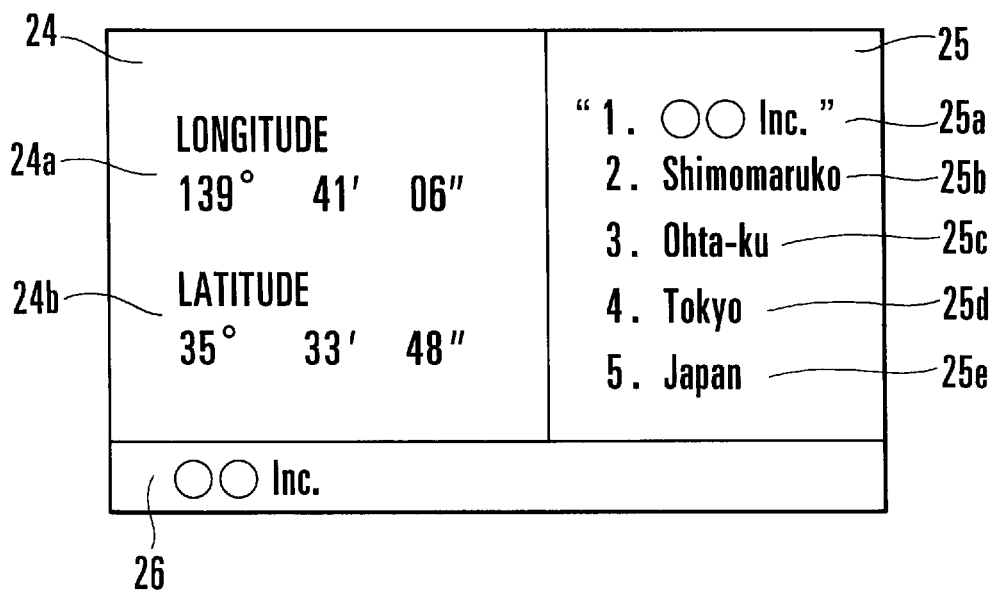
FIG. 3 is a view showing one example of a display provided in Step S103 of FIG. 2.

If the control circuit 1a determines in Step S102 that there is absolute-position information in the read information, the process proceeds to Step S103, in which the display part 5 is made to provide a place-name conversion mode display as shown in FIG. 3. At this time, the place-name conversion mode display is superimposed on the image information for the purpose of improving operability.

One example of the place-name conversion mode display will be described below with reference to FIG. 3.

Referring to FIG. 3, a display part 24 is an absolute-position display part for displaying absolute-position information, a display part 24a is a longitude display part for displaying a longitude as an absolute position, and a display part 24b is a latitude display part for displaying a latitude as an absolute position. In this embodiment, the location of a certain company is displayed by way of example.

A display part 25 is a converted place-name display part for displaying a place name which is obtained by automatic conversion corresponding to the absolute-position information. In the converted place-name display part 25, the place name is displayed at five hierarchal levels in display parts 25a to 25e which respectively correspond to different degrees of coarseness of geographical resolution. More specifically, the display part 25a serves as a display part for displaying a place name corresponding to the minimum hierarchal level, the display parts 25b, 25c and 25d serve as display parts for displaying place names corresponding to the second to fourth hierarchal levels, respectively, and the display part 25e serves as a display part for displaying a place name corresponding to the maximum hierarchal level. In the example shown in FIG. 3, the display part 25a is blinking to indicate that the place name displayed in the display part 25a at the minimum hierarchal level is selected.

A display part 26 is a selected place-name display part for displaying the place name corresponding to the hierarchal level selected in the converted place-name display part 25.

Figure 4:
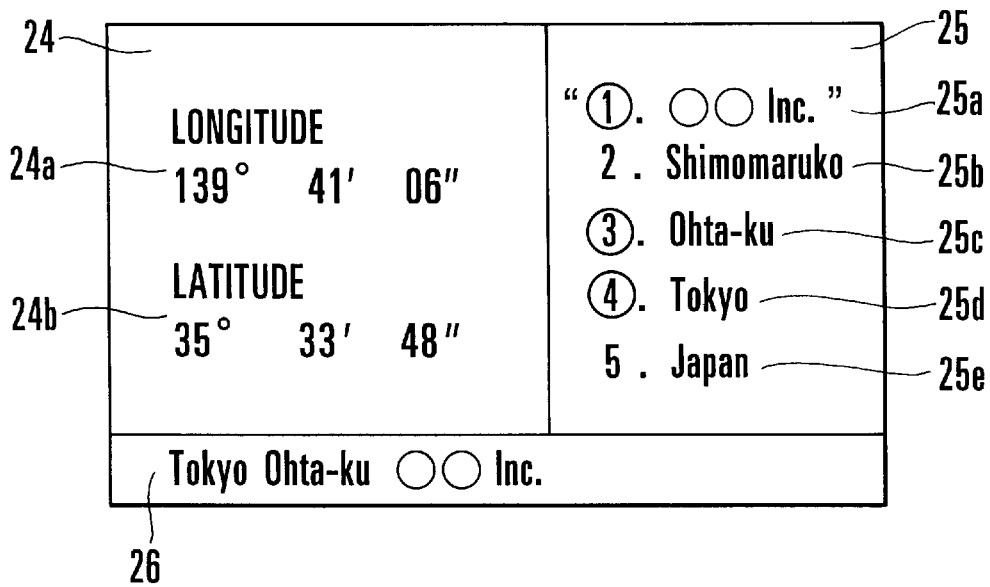
FIG. 4 is a view showing another example of the display provided in Step S103 of FIG. 2.

FIG. 4 is a view showing another example of the place-name conversion mode display shown in FIG. 3, and identical reference numerals are used to denote display parts identical to those shown in FIG. 3.

The operation of Step S103 will be described in detail with reference to FIG. 3. The absolute-position information read by the position information reading part 3 is displayed in the absolute-position display part 24. More specifically, "LONGITUDE 139°41'06''" and "LATITUDE 35°33'48''" are respectively displayed in the longitude display part 24a and the latitude display part 24b. In the converted place-name display part 25, the result obtained by comparing the absolute-position information with the place-name database 4 is displayed at a plurality of hierarchal levels which respectively correspond to different degrees of coarseness of geographical resolution. Specifically, "LONGITUDE 139°41'06''" and "LATITUDE 35°33'48''" are compared with the place-name database 4, so that "1. ○○ Inc." is displayed in the display part 25a as the minimum resolution hierarchal display and "2. Shimomaruko", "3. Ohta-ku", "4. Tokyo" and "5. Japan" are respectively displayed in the display parts 25b to 25e in the order of coarseness of geographical resolution.

In this embodiment, its program is set so that the display part 25a corresponding to the minimum resolution hierarchal level is first selected, and FIG. 3 shows that the display part 25a is blinking to indicate its selected state.

In the selected place-name display part 26, "○○ Inc." is displayed which corresponds to the place name selected at the hierarchal level of the display part 25a, and during this state,-if a user presses a decision button (not shown), the converted place name is defined as "○○ Inc."

If the user desires to convert the absolute-position information into the place name "4. Tokyo" instead of the place name "1. ○○ Inc." which corresponds to the minimum hierarchal level, the user may change the selected hierarchal level through an operating member (not shown). If the user changes the selected hierarchal level by operating the operating member (not shown), a place name corresponding to a newly selected hierarchal level is blinked in the above-described manner. For example, if the user operates the operating member (not shown) to blink "4. Tokyo" and presses the decision button (not shown), the converted place name is defined as "Tokyo" in the selected place-name display part 26.

Place-name conversion which converts absolute-position information into a string of different hierarchal place names will be described below with reference to FIG. 4 by way of example.

The display contents shown in FIG. 4 are identical to those shown in FIG. 3. As shown in FIG. 4, if the user selects one of the hierarchal levels in the converted place-name display part 25 and presses the decision button, one place name is defined as a converted place name. Then, if the user changes the selection through the operating member (not shown) and presses the decision button, a newly converted place name is added after the previously converted place name. Place names corresponding to previously selected and determined hierarchal levels are displayed in a different manner from that of display of a place name which is currently selected but not yet determined.

In the example shown in FIG. 4, three of numbers 1 to 5 which represent the order of hierarchy are respectively surrounded by circles which indicate selected positions. Otherwise, place names corresponding to previously selected and determined hierarchal levels may be displayed in a different color from a display color for the remaining place names. The added place names are displayed in order from the maximum hierarchal level in the selected place-name display part 26.

In Japan, place names are in general displayed in order from the maximum hierarchal level toward the minimum hierarchal level, but in the United States of America, since place names are expressed in order from the minimum hierarchal level, they may be displayed in order from the minimum hierarchal level toward the maximum hierarchal level.

Returning to FIG. 2, after the completion of the operation of Step S103, the process proceeds to Step S104, in which the control circuit 1a determines whether to execute the above-described conversion to a place name. The control circuit 1a makes this decision by determining whether a cancel button (not shown) has been pressed. If the control circuit 1a determines that the cancel button has been pressed to cancel the conversion to a place name, the process proceeds to Step S106.

If it is determined in Step S104 that the conversion to a place name need be executed, the process proceeds to Step S105, in which the control circuit 1a executes an operation similar to the above-described operation of Step S103. Then, the process proceeds to Step S106, in which the control circuit 1a selects a control mode for writing the defined place name into the image recording medium 7, and, in Step S107, determines whether to actually write the place name into the image recording medium 7. The control circuit 1a makes this decision by determining whether the cancel button (not shown) has been pressed. If the control circuit 1a determines that the cancel button has been pressed to cancel the writing of the place name, the process proceeds to Step S110, in which the control circuit 1a provides both display of the image and display of the place name (the place name displayed in the selected place-name display part 26).

If it is determined in Step S107 that the writing of the place name into the image recording medium 7 needs to be executed, the process proceeds to Step S108, in which the control circuit 1a determines whether the place name can be written into the image recording medium 7, i.e., checks the recording capacity of the image recording medium 7. The reason for this is that the required writing capacity increases if place names corresponding to a plurality of hierarchal levels are selected as shown in FIG. 4. In Step S108, if the control circuit 1a checks a recording capacity allocated for one image and determines that the recording capacity is sufficient, the process proceeds to Step S109, in which the converted place name is recorded on the image recording medium 7 by the place-name recording part 6. Then, in Step S110, the recorded place name is displayed in the state of being superimposed on the image information.

If it is determined in Step S108 that the recording capacity is insufficient, the process proceeds to Step S111, in which the display part 5 is made to provide a warning display. Incidentally, dedicated warning means may be provided in the image display apparatus, or a warning such as sound may also be used.

An example of the warning display will be described below with reference to FIG. 5.

Figure 5:
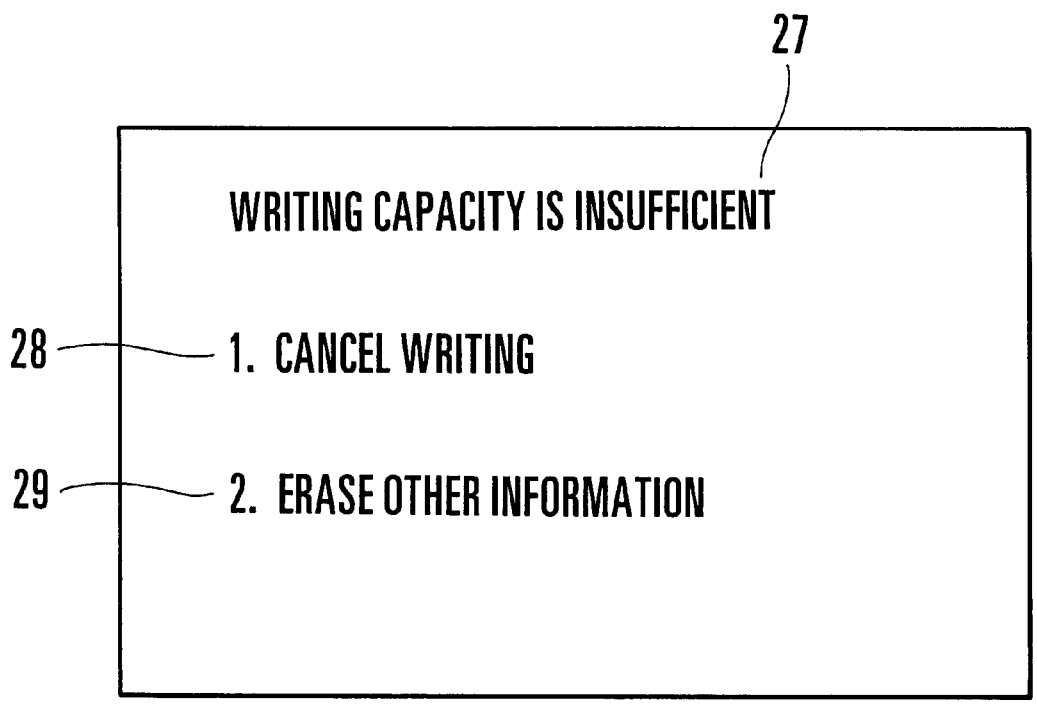
FIG. 5 is a view showing one example of a warning display provided in Step S111 of FIG. 2.

Referring to FIG. 5, a display part 27 is a warning display part for providing a warning display when the place-name writing capacity of the image recording medium 7 is insufficient, a display part 28 is a processing selecting display part which allows the user to select the processing of canceling writing, when the writing capacity is insufficient, and a display part 29 is a processing selecting display part which allows the user to select the processing of erasing other information and writing a place name, when the writing capacity is insufficient.

If the warning display is provided in Step S111, the display of FIG. 5 appears on the display part 5, and the user is allowed to select either one of the display parts 28 or 29 by operating the operating member (not shown). If the display part 28 is selected in Step S112, the process proceeds to Step S110, whereas if the processing of erasing other information and writing a place name (the display part 29) is selected, the process proceeds to Step S113, in which the control circuit 1a erases other information and executes the operations of Steps S109 and S110.

Incidentally, the information erased in Step S113 is, for example, information corresponding to any of the plurality of hierarchal levels shown in FIG. 4. Although information such as date and title is also displayed if recorded, such information may be selected as information to be erased.

Although the above-described embodiment uses GPS information as absolute-position information, the base station information of PHS (personal handyphone system) may also be used.

The image display apparatus may have either a place-name database for only Japan or a place-name database for the world, and may of course be arranged to be able to display various languages such as Japanese and English. The place-name database can be upgraded to an upper version by adding new data or rewriting old data. In addition, it is possible to make a printout from at least an image or a place name outputted from the image display apparatus.

As is apparent from the above description, according to the above-described embodiment, it is possible to provide an image display apparatus capable of automatically converting absolute-position information into place-name information without forcing a user to perform an awkward operation.

In addition, it is possible to provide an image display apparatus capable of repeatedly displaying image information and place-name information while maintaining the correspondence between the image information and the place-name information.

In addition, it is possible to provide an image display apparatus capable of informing a user that recording of place-name information can be executed.

In addition, it is possible to provide an image display apparatus capable of facilitating selection of place-name information to be defined.

Figure 6:
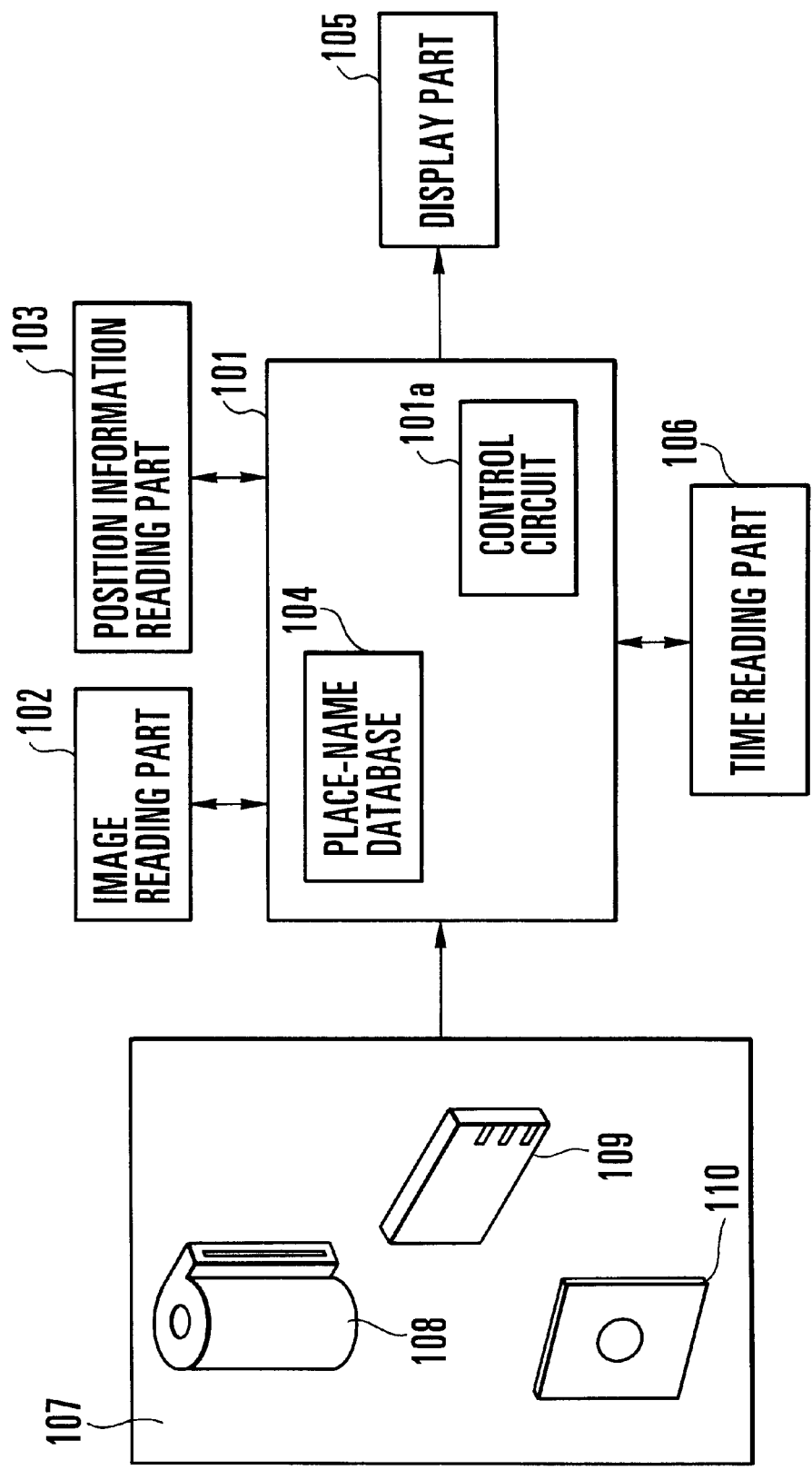
FIG. 6 is a schematic block diagram showing the construction of an image display apparatus according to another embodiment of the present invention.

FIG. 6 is a block diagram showing the arrangement of an image display apparatus according to another embodiment of the present invention.

Referring to FIG. 6, an image-display-apparatus body part 101 has a control circuit 101a and a place-name database 104, and connected to the image-display-apparatus body part 101 are an image reading part 102, a position information reading part 103, a display part 105 for displaying an image or information, and a time recording part 106 for recording time information. All of these elements constitute the image-display-apparatus body part 1. An image recording medium 107 is, for example, a magnetically recordable type of silver-halide film 108, a solid-state memory 109 in which an image and absolute-position information are digitally recorded, or a similar floppy disk 110.

The image recording medium 107 is arranged to be connectable to the image-display-apparatus body part 101.

An image photographed during photography using a camera (not shown) and its absolute-position information can be recorded in the image recording medium 7. The absolute-position information is provided by a GPS (Global Positioning System) receiver (position measuring means for receiving radio waves from satellites and outputting position information) which is incorporated in the camera. When photography is performed with the camera with the absolute-position information being recordable, the absolute-position information is automatically recorded during the photography as information which is converted into a particular code. At the same time, photography time information is also automatically recorded by the time reading part 106.

Specifically, if the image recording medium 107 is the film cartridge 108 having a magnetically recordable type of film, an image is optically recorded and its absolute-position information is digitally magnetically recorded on a magnetic layer with which the film is coated. If the image recording medium 107 is the solid-state memory 109 or the floppy disk 110, an image is converted into a digital signal by a solid-state image pickup element, while its absolute-position information is digitally recorded as coded information together with the image information.

One example of display of information items in a place-name conversion mode will be described below with reference to FIG. 7. This display is superimposed on an image displayed in the display part 105.

Figure 7:
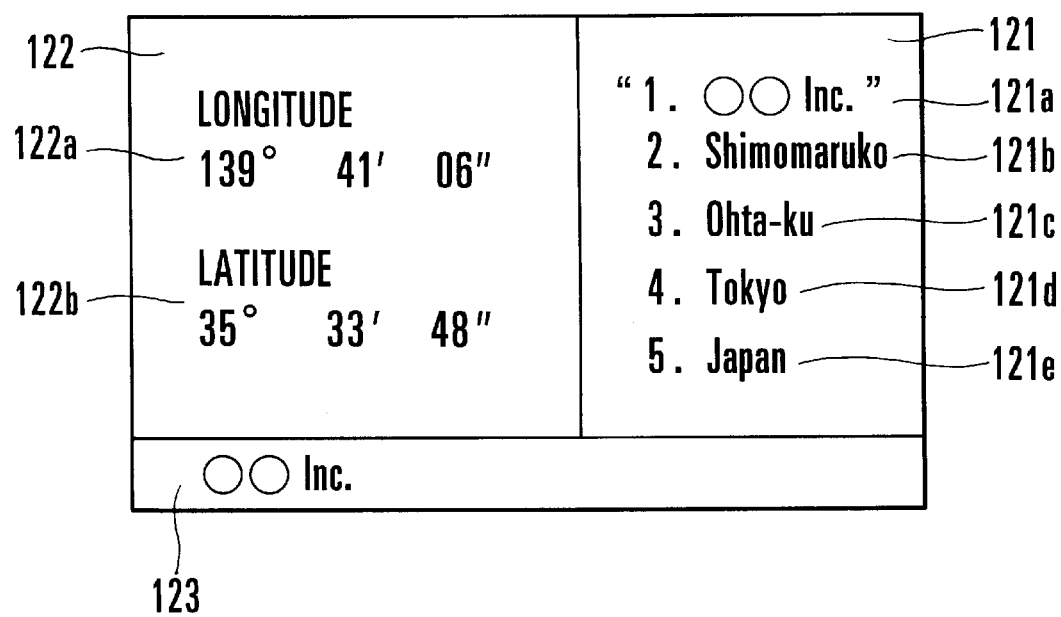
FIG. 7 is a view showing one example of place-name conversion data to be displayed in a display part shown in FIG. 6 together with an image.

Referring to FIG. 7, a display part 122 is an absolute-position display part for displaying absolute-position information, a display part 122a is a longitude display part for displaying a longitude as an absolute position, and a display part 122b is a latitude display part for displaying a latitude as an absolute position. In this embodiment, the location of a certain company is displayed by way of example. A display part 121 is a converted place-name display part for displaying a place name which is obtained by automatic conversion corresponding to the absolute-position information. In the converted place-name display part 121, the place name is displayed at five hierarchal levels in display parts 121a to 121e which respectively correspond to different degrees of coarseness of geographical resolution. More specifically, the display part 121a serves as a display part for displaying a place name corresponding to the minimum hierarchal level, the display parts 121b, 121c and 121d serve as display parts for displaying place names corresponding to the second to fourth hierarchal levels, respectively, and the display part 121e serves as a display part for displaying a place name corresponding to the maximum hierarchal level. In the example shown in FIG. 8, the display part 121a is blinking to indicate that the place name displayed in the display part 121a at the minimum hierarchal level is selected. A display part 123 is a selected place-name display part for displaying the place name corresponding to the hierarchal level selected in the converted place-name display part 25.

Figure 8:
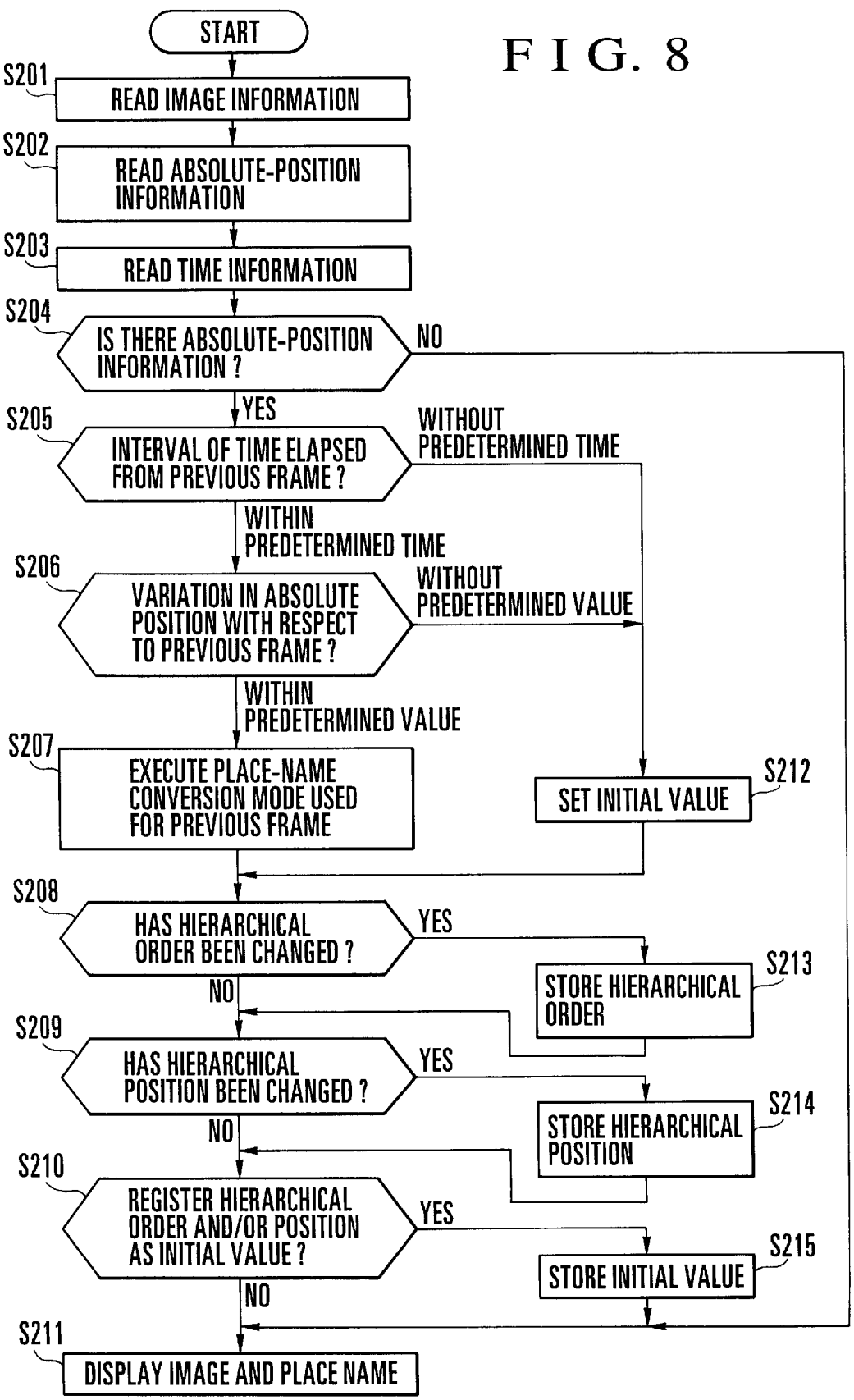
FIG. 8 is a flowchart showing the operation of the image display apparatus shown in FIG. 6.

The operation of the image display apparatus having the above-described arrangement will be described below with reference to the flowchart shown in FIG. 8.

If the image recording medium 107 is connected to the image-display-apparatus body part 101 and a start switch (not shown) is turned on, the control circuit 101a starts its operation in Step S201, and then in Step S201, operates the image reading part 102 to read image information from the image recording medium 107. If the image recording medium 107 is the magnetically recordable type of film 108, the image information is read by, for example, an image scanner. If the image recording medium 107 is the solid-state memory 109 or the floppy disk 110, the image information is read as digital signals by a known art.

In Step S202, the control circuit 101a operates the position information reading part 103 to read the corresponding absolute-position information from the image recording medium 107. If the image recording medium 107 is the film cartridge 108 having a magnetically recordable type of silver-halide film, the absolute-position information is read from the film by, for example, a magnetic head. If the image recording medium 107 is the solid-state memory 109 or the floppy disk 110, the absolute-position information is read as a digital signal by a known art similarly to the image information. Then, in Step S203, the control circuit 101a operates the time reading part 106 to read time information from the image recording medium 107 similarly to the absolute-position information.

In the next step S204, the control circuit 101a determines whether there is absolute-position information in the read information. If there is no absolute-position information, the process immediately proceeds to Step S211, in which the display part 105 is made to display only the read image information. The display part 105 may be a known color liquid crystal display part integral with the image display apparatus, or a television set or a CRT monitor which is externally connected to and controlled by the image display apparatus.

If the control circuit 101a determines in step S204 that there is absolute-position information in the read information, the process proceeds to Step S205, in which the control circuit 101a detects a photography time interval elapsed from the previous frame to the current frame, from the time information read by the time reading part 106, and determines whether the photography time interval has exceeded a predetermined time. If the photography time interval elapsed between the previous frame and the current frame is within the predetermined time, the process proceeds to Step S206, because the probability that a user performed photography for the same purpose throughout both frames is high and, therefore, the intention of the user can be more fully reflected by selecting a place-name conversion mode which was used for place-name conversion for the previous frame.

On the other hand, if the predetermined time has elapsed or time information is not recorded in the previous frame, the process proceeds to Step S212, in which the control circuit 101a performs setting to provide display of the hierarchal order of place-name conversion and the position of a selected hierarchal level both of which are previously stored as initial values. One example of this setting will be described below with reference to FIG. 7. Incidentally, the display shown in FIG. 7 is superimposed on an image displayed in the display part 105, as described above.

The absolute-position information read in Step S202 is displayed in the absolute-position display part 122. More specifically, "LONGITUDE 139°41'06''" and "LATITUDE 35°33'48''" are respectively displayed in the longitude display part 122a and the latitude display part 122b. In the converted place-name display part 121, the result obtained by comparing the absolute-position information with the place-name database 104 is displayed at a plurality of hierarchal levels which respectively correspond to different degrees of coarseness of geographical resolution. Specifically, "LONGITUDE 139°41'06''" and "LATITUDE 35°33'48''" are compared with the place-name database 104, so that "1. ○○ Inc." is displayed in the display part 121a as the minimum resolution hierarchal display and "2. Shimomaruko", "3. Ohta-ku", "4. Tokyo" and "5. Japan" are respectively displayed in the display parts 121b to 121e in the order of coarseness of geographical resolution.

This embodiment is preset so that the display part 121a corresponding to the minimum resolution hierarchal level is first selected, and FIG. 7 shows that the display part 121a is blinking to indicate its selected state. In the selected place-name display part 123, "○○ Inc." is displayed which corresponds to the place name selected at the hierarchal level of the display part 121. This is because, in general photographs, a strongest connection appears between a photographed image and a place name corresponding to the minimum resolution hierarchal level. During this state, if the user presses a decision button (not shown), the converted place name is defined as "○○ Inc."

After the completion of the operation of the Step S212, the process proceeds to Step S208 which will be described later.

If the photography time interval between the previous frame and the current frame is within the predetermined time, the process proceeds to Step S206, as described previously. In Step S206, the control circuit 101a determines from the absolute-position information whether a variation in absolute position is within a predetermined value with respect to the previous frame. If the variation in absolute position is not within the predetermined value, i.e., the location of photography greatly differs between the previous frame and the current frame, it is determined that there is a strong possibility that the purpose of photography changed between both frames even on the same date of photography, and the process proceeds to Step S212, in which the control circuit 101a performs setting to provide display of the hierarchal order of place-name conversion and the position of a selected hierarchal level both of which are previously stored as initial values, as described previously with reference to FIG. 7. Then, the process proceeds to Step S208.

If it is determined in Step S206 that the variation in absolute position is within the predetermined value with respect the previous frame, the process proceeds to Step S207, in which place-name conversion is performed in a place-name conversion mode which was used for the previous frame.

One display example for this place-name conversion will be described below with reference to FIG. 9.

For example, it is assumed that "LONGITUDE 139°44'56''" and "LATITUDE 35°40'03''" are compared with the place-name database 104 for the purpose of place-name conversion. Since the display example shown in FIG. 9 is intended for the first frame, the place-name conversion is performed in a place-name conversion mode which is prepared as the initial values described above in connection with Step S212 of FIG. 8. Specifically, "1. Patent Office" is displayed in the display part 121a as the minimum resolution hierarchal display and "2. Kasumigaseki", "3. Chiyoda-ku", "4. Tokyo" and "5. Japan" are respectively displayed in the display parts 121b to 121e in the order of coarseness of geographical hierarchal resolution. Since the example shown in FIG. 9 is preset so that the display part 121a corresponding to the minimum resolution hierarchal level is first selected, the display part 121a blinks and "Patent Office" which corresponds to a place name selected from the hierarchal levels of the display part 121 is displayed in the selected place-name display part 123.

Incidentally, if the current frame is not the first frame and the order of hierarchy or the position of a selected hierarchal position is changed at the time of the previous frame, place-name conversion is performed in accordance with the changed order of hierarchy or the changed hierarchal position and the obtained place name is displayed in the selected place-name display part 123.

In the next step S208, the control circuit 101a determines whether the operation of changing the order of the currently selected hierarchal level has been performed, and if it is determined that the changing operation has been performed, the process proceeds to Step S213, in which a changed hierarchal order is stored.

Figure 10:
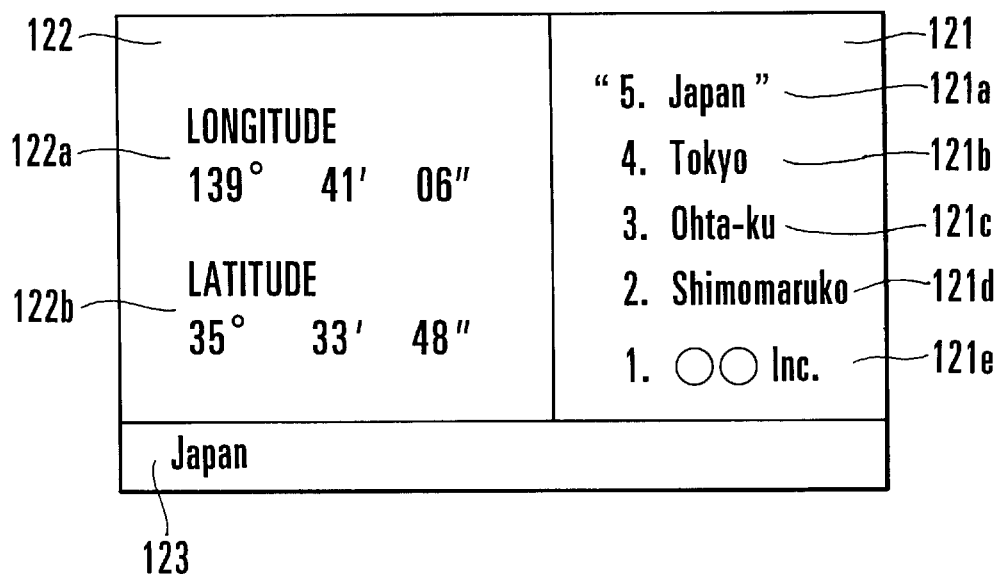
FIG. 10 is a view showing a display example in which the order of hierarchy is changed in Step S213 of FIG. 8.

FIG. 10 shows one display example in which the order of hierarchy is changed compared to the display shown in FIG. 7. In the display example shown in FIG. 10, the order of hierarchy in the converted place-name display part 121 is changed so that the order of hierarchy starts not from the minimum hierarchal level "○○ Inc." but from the maximum hierarchal level "Japan". Accordingly, "5. Japan" is displayed in the display part 121a as the minimum resolution hierarchal display and "4. Tokyo", "3. Ohta-ku", "2. Shimomaruko" and "1. ○○ Inc." are respectively displayed in the display parts 121b to 121e in the order of fineness of geographical hierarchal resolution. The display part 121a is blinking and "Japan" which corresponds to a place name selected from the hierarchal levels of the display part 121 is displayed in the selected place-name display part 123.

If it is not determined in Step S208 that the operation of changing the order of hierarchy has been performed or after the operation of Step S213 is completed, the process proceeds to Step S209.

In Step S209, the control circuit 101a determines whether the operation of changing the currently selected hierarchal position has been performed. If it is determined that the changing operation has been performed, the process proceeds to Step S214, in which a changed hierarchal position is stored.

Figure 11:
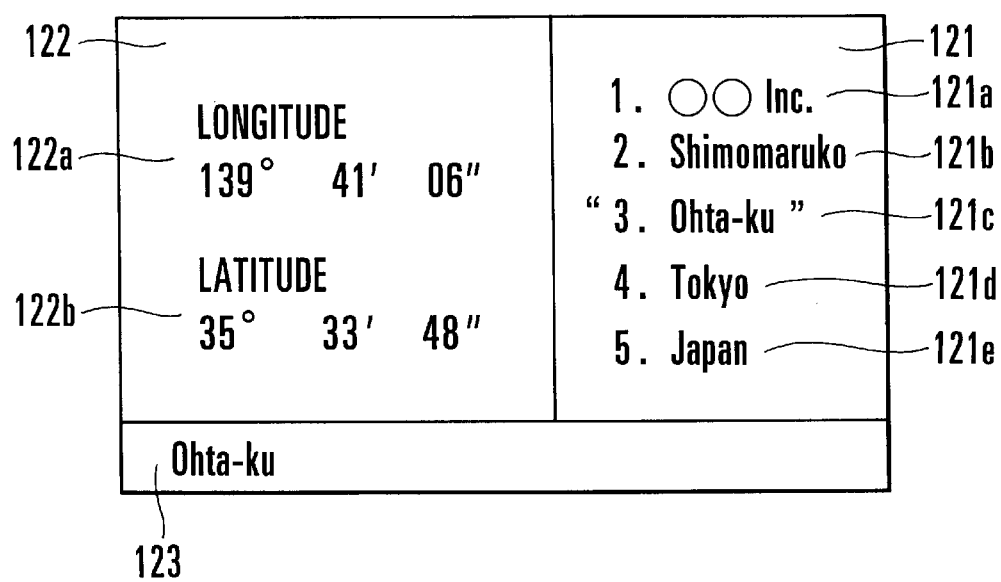
FIG. 11 is a view showing a display example in which the position of hierarchy is changed in Step S214 of FIG. 8.

FIG. 11 shows one display example in which the position of hierarchy (place name) is changed compared to the display shown in FIG. 7. In the display example shown in FIG. 11, the position of hierarchy is changed from the display part 121*a* ("1. ◯◯ Inc.") to the display part 121*c* ("3. Ohta-ku"). Accordingly, the display part 121*c* is blinking and "Ohta-ku" which corresponds to a place name selected from the hierarchal levels of the display part 121 is displayed in the selected place-name display part 123.

If it is not determined in Step S209 that the operation of changing the position of hierarchy has been performed or after the operation of Step S214 is completed, the process proceeds to Step S210.

In Step S210, the control circuit 101*a* determines whether the operation of registering the order of hierarchy stored in Step S213 or (and) the position of hierarchy stored in Step S214, as an initial value for the next frames, has been performed. If it is determined that the registering operation has been performed, the process proceeds to Step S215, in which the changed order and position of hierarchy are stored, and then proceeds to Step S211. If it is not determined in Step S210 that the registering operation has been performed, the process immediately proceeds to Step S211.

Figure 9:
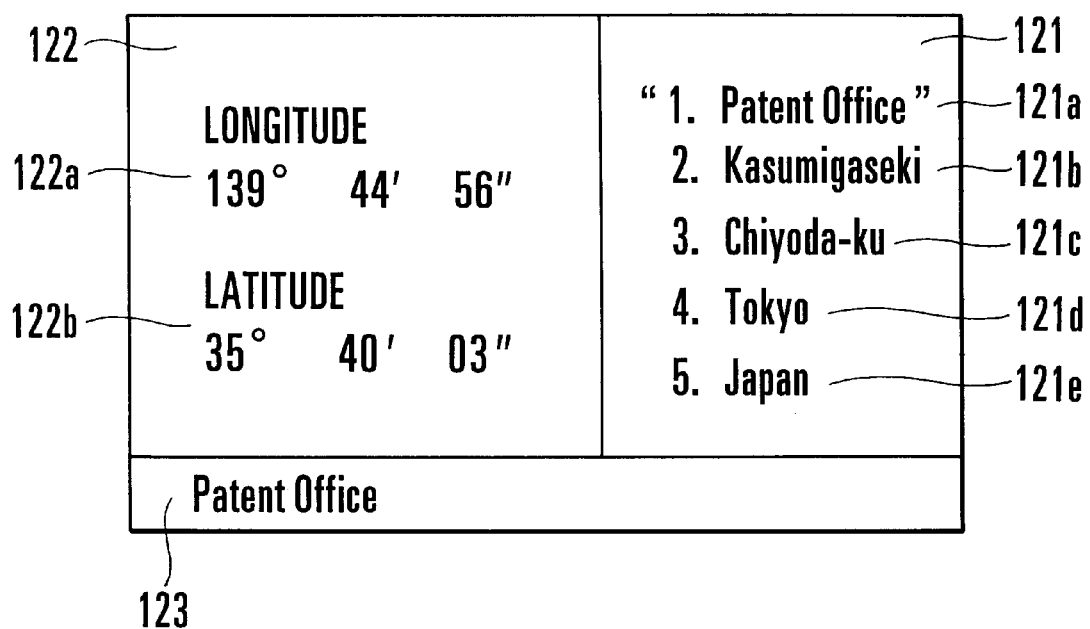
FIG. 9 is a view showing a display example for a place-name conversion mode set in Step S212 of FIG. 8.

In Step S211, the converted place name information is displayed in the state of being superimposed on an image (not shown) in the display part 105, in accordance with the order and position of hierarchy which are preset as the initial values or the changed order and position of hierarchy, as shown in FIGS. 9 to 11.

Although in the above-described embodiment the hierarchal order of place names is arranged to start from the minimum hierarchal level or the maximum hierarchal level, the hierarchal order is not limited to such an example, and may also be a random order.

Although the above-described embodiment is arranged so that only one hierarchal position is selected, it is also possible to adopt an arrangement capable of selecting a plurality of hierarchal positions. For example, according to this arrangement, if the display parts 121*a* and 121*c* of FIG. 7 are selected, "◯◯ Inc. Ohta-ku" is displayed in the selected place-name display part 123.

Display may be provided in an arbitrary language according to the location of photography.

The place-name database can be upgraded by adding new data or rewriting old data, and a printout can be made from at least an image and absolute-position information displayed on the image display apparatus.

According to the above-described embodiment, the order of hierarchy of place names and the position of a selected hierarchal level can be changed, and if either of them is changed, the changed contents are stored so that they can be used as a place-name conversion mode for the next frame. Accordingly, place-name conversion suited to the taste of a user can be successively effected, and an great improvement in operability can be provided.

In addition, if the photography time interval elapsed between the previous frame and the current frame is within a predetermined time or a variation in position (location of photography) is within a predetermined value, place-name conversion is performed in a predetermined place-name conversion mode which is preset, and a mode which is most frequently used is set as the predetermined place-name conversion mode which is preset, so that best place-name conversion is possible at any time. Specifically, since the minimum hierarchal level is specified as an initial value, the correspondence between a photographed image and place-name information can be identified at a glance.

As is apparent from the above-described embodiment, it is possible to provide an image display apparatus which is capable of successively effecting place-name conversion suited to the taste of a user without forcing the user to perform an awkward operation such as the operation of repeatedly setting the desired hierarchal level or position of place-name data each time a place name is to be converted and displayed.

It is possible to provide an image display apparatus which is capable of successively effecting place-name conversion suited to the taste of a user without forcing the user to perform an awkward operation such as the operation of repeatedly setting the desired hierarchal level or position of place-name data each time a place name is to be converted and displayed, as well as which is capable of effecting best conversion of place-name data at any time even if a predetermined variation occurs in absolute-position information or time information.

What is claimed is:

1. A display apparatus comprising:

position information circuit which detects latitude and longitude information;

a storage medium which stores a plurality of place-name data corresponding to the latitude and longitude information, said place-name data being composed of a plurality of place-name data hierarchically indicating the same area with respect to the same latitude and longitude information;

reading circuit which reads said plurality of hierarchical place-name data from the storage medium on the basis of the latitude and longitude information;

display device which displays the plurality of hierarchical place-name data read by said reading circuit;

changing circuit which changes an order of hierarchy of the plurality of hierarchical place-name data; and setting circuit which stores the order of hierarchy changed by said changing circuit, as an order of hierarchy according to which said display device provides the next display.

2. A display apparatus according to claim 1, wherein said reading circuit, in its initial state, reads the plurality of hierarchical place-name data in order from a minimum hierarchical level.

3. A display apparatus according to claim 1, further comprising time reading circuit for reading time information, wherein said setting circuit erases the stored order of hierarchy if a predetermined variation occurs in the time information.

4. A display apparatus according to claim 1, wherein said setting circuit erases the stored order of hierarchy if a predetermined variation occurs between the previously read latitude and longitude information and the presently read latitude and longitude information.

5. A display apparatus according to claim 3, wherein said setting circuit erases the stored order of hierarchy if a predetermined variation occurs between the previously read latitude and longitude information and the presently read latitude and longitude information.

6. A display apparatus according to claim 3, wherein the fact that the predetermined variation occurs in the time information that the time information varies by an amount greater than a predetermined time.

7. A display apparatus according to claim 4, wherein the fact that the predetermined variation occurs in the latitude and longitude information that the latitude and longitude information varies by an amount greater than a predetermined value.

8. A display apparatus comprising:

position information circuit which detects latitude and longitude information;

a storage medium which stores a plurality of place-name data corresponding to the latitude and longitude information, said place-name data being composed of a plurality of place-name data hierarchically indicating the same area with respect to the same latitude and longitude information;

selecting circuit which selects the place name data stored in said storage medium, on the basis of said latitude and longitude information, said circuit selecting said selected place-name data in the order of hierarchy; and display device which displays said place-name data selected in the order of hierarchy.

* * * * *

UNITED STATES PATENT AND TRADEMARK OFFICE
CERTIFICATE OF CORRECTION

PATENT NO.    : 6,469,698 B2
DATED         : October 22, 2002
INVENTOR(S)   : Hidehiko Fukahori It is certified that error appears in the above-identified patent and that said Letters Patent is hereby corrected as shown below:

<u>Column 4,</u>
Line 59, delete "state,-if" and insert -- state, if --.

Signed and Sealed this

Fourteenth Day of October, 2003

JAMES E. ROGAN
*Director of the United States Patent and Trademark Office*